(12) United States Patent
Kohama et al.

(10) Patent No.: US 11,649,984 B2
(45) Date of Patent: May 16, 2023

(54) AIR CONDITIONER

(71) Applicant: SHARP KABUSHIKI KAISHA, Sakai (JP)

(72) Inventors: Takashi Kohama, Sakai (JP); Yuusuke Ozaki, Sakai (JP); Yoshinori Nakamura, Sakai (JP); Keitaro Yamada, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 286 days.

(21) Appl. No.: 17/011,875

(22) Filed: Sep. 3, 2020

(65) Prior Publication Data
US 2021/0080147 A1 Mar. 18, 2021

(30) Foreign Application Priority Data

Sep. 13, 2019 (JP) .............................. JP2019-167023

(51) Int. Cl.
*B01D 46/00* (2022.01)
*B01D 46/10* (2006.01)
*B01D 46/12* (2022.01)
*B01D 46/46* (2006.01)
*F24F 13/28* (2006.01)
(Continued)

(52) U.S. Cl.
CPC .......... *F24F 13/28* (2013.01); *B01D 46/0002* (2013.01); *B01D 46/0038* (2013.01); *B01D 46/0049* (2013.01); *B01D 46/10* (2013.01); *F24F 6/00* (2013.01); *F24F 7/007* (2013.01); *B01D 2279/50* (2013.01)

(58) Field of Classification Search
CPC .... B01D 46/0002; B01D 46/10; B01D 46/12; B01D 46/46; B01D 2279/50; B01D 2273/30; F24F 13/28; F24F 6/00; F24F 7/007; F24F 13/08; F24F 2006/008
USPC .................. 55/385.1, 467, 471; 62/326, 427, 62/DIG. 16; 98/34.6, 64, 35, 39.1, 94.2
See application file for complete search history.

(56) References Cited

U.S. PATENT DOCUMENTS 3,618,659 A * 11/1971 Rawal ..................... F24F 3/044
165/104.34
4,759,196 A * 7/1988 Davis .................... F24F 1/0035
55/471
(Continued)

FOREIGN PATENT DOCUMENTS

CN 108700317 A 10/2018
EP 3425293 A1 1/2019
(Continued)

*Primary Examiner* — Minh Chau T Pham
(74) *Attorney, Agent, or Firm* — ScienBiziP, P.C.

(57) ABSTRACT

An air conditioner includes: an air blower configured to take air from an inlet, and to blow the air from an outlet; a filter configured to purify the air; a first chamber and a second chamber taking the air purified by the filter; a humidification filter provided in the second chamber, and humidifying the air taken into the second chamber; and a divider opening and closing an opening that provides communication between the first chamber and the second chamber, and adjusting a volume of the air taken from the first chamber into the second chamber. The air taken from the first chamber into the second chamber and/or the air taken into the second chamber is blown from the outlet.

12 Claims, 3 Drawing Sheets

(51) Int. Cl.
*F24F 6/00* (2006.01)
*F24F 7/007* (2006.01)

(56) References Cited

U.S. PATENT DOCUMENTS

| | | | | |
|---|---|---|---|---|
| 5,256,103 | A * | 10/1993 | Abthoff | B60H 3/0625 454/158 |
| 7,993,589 | B1 * | 8/2011 | Shigemoto | A61L 9/01 422/122 |
| 2009/0314164 | A1 | 12/2009 | Yamashita et al. | |
| 2014/0224127 | A1 * | 8/2014 | Nagata | F24F 8/10 55/467 |
| 2016/0175755 | A1 * | 6/2016 | Nakamura | F24F 6/06 55/385.6 |

FOREIGN PATENT DOCUMENTS

| | | |
|---|---|---|
| JP | 2008-039329 A | 2/2008 |
| JP | 2008035998 A | 2/2008 |
| JP | 2009250504 A | 10/2009 |
| JP | 2011202815 A | 10/2011 |

\* cited by examiner

AIR CONDITIONER

CROSS-REFERENCE TO RELATED APPLICATION

The present application claims priority from Japanese Application JP2019-167023, the content to which is hereby incorporated by reference into this application.

BACKGROUND OF THE INVENTION

1. Field of the Invention

The present invention relates to an air conditioner.

2. Description of the Related Art

Air conditioners include such a device as an air cleaner capable of humidifying air. For example, Japanese Unexamined Patent Application Publication No. 2008-39329 discloses an air cleaner including: a humidifier humidifying air passing through an air filter, a humidified air flow path releasing the humidified air from an outlet; and a clean air flow path releasing the air, passing through the air filter, from the outlet.

SUMMARY OF THE INVENTION

Unfortunately, the air cleaner disclosed in Japanese Unexamined Patent Application Publication No. 2008-39329 has a problem: if the fan is driven at higher speed to obtain greater humidification performance, the volume of air to run in the humidified air flow path increases; whereas, the volume of air to run in the clean air flow path also increases inevitably because the pressure rises for the air to pass through the humidifier. As a result, the air could not be sufficiently humidified. Moreover, the two air flow paths are always open, such that even if the air cleaner performs air cleaning alone, the air runs through the humidifier positioned in the humidified air flow path. Such a configuration poses a problem that the humidifier would become unclean quickly. An aspect of the present invention intends to provide an air conditioner capable of adjusting a volume of air when the air conditioner humidifies and cleans the air.

(1) An air conditioner according to an aspect of the present invention includes: an air blower configured to take air from an inlet, and to blow the air from an outlet; a filter configured to purify the air, a first chamber and a second chamber taking the air purified by the filter, a humidification filter provided in the second chamber, and humidifying the air taken into the second chamber; and a divider opening and closing an opening that provides communication between the first chamber and the second chamber, and adjusting a volume of the air taken from the first chamber into the second chamber. The air taken from the first chamber into the second chamber and/or the air taken into the second chamber is blown out from the outlet.

(2) In the air conditioner according to an aspect of the present invention, in providing the communication between the first chamber and the second chamber, the opening is positioned closer to the outlet than to the humidifying filter in the second chamber.

(3) In the air conditioner according to an aspect of the present invention, the first chamber is provided above the second chamber.

(4) In the air conditioner according to an aspect of the present invention, the air blower is provided closer to the outlet than to the second chamber.

(5) In the air conditioner according to an aspect of the present invention, the divider is driven to close the opening in humidification operation that involves humidifying the air, and to open the opening in non-humidification operation.

(6) In the air conditioner according to an aspect of the present invention, the humidifying filter draws up water in the humidification operation, and keeps from drawing up the water in the non-humidification operation.

DETAILED DESCRIPTION OF THE INVENTION

Described below are embodiments of the present invention, with reference to the drawings. Note that like reference signs designate identical or corresponding components throughout the drawings, and such components will not be repeatedly elaborated upon.

First Embodiment

Figure 1:
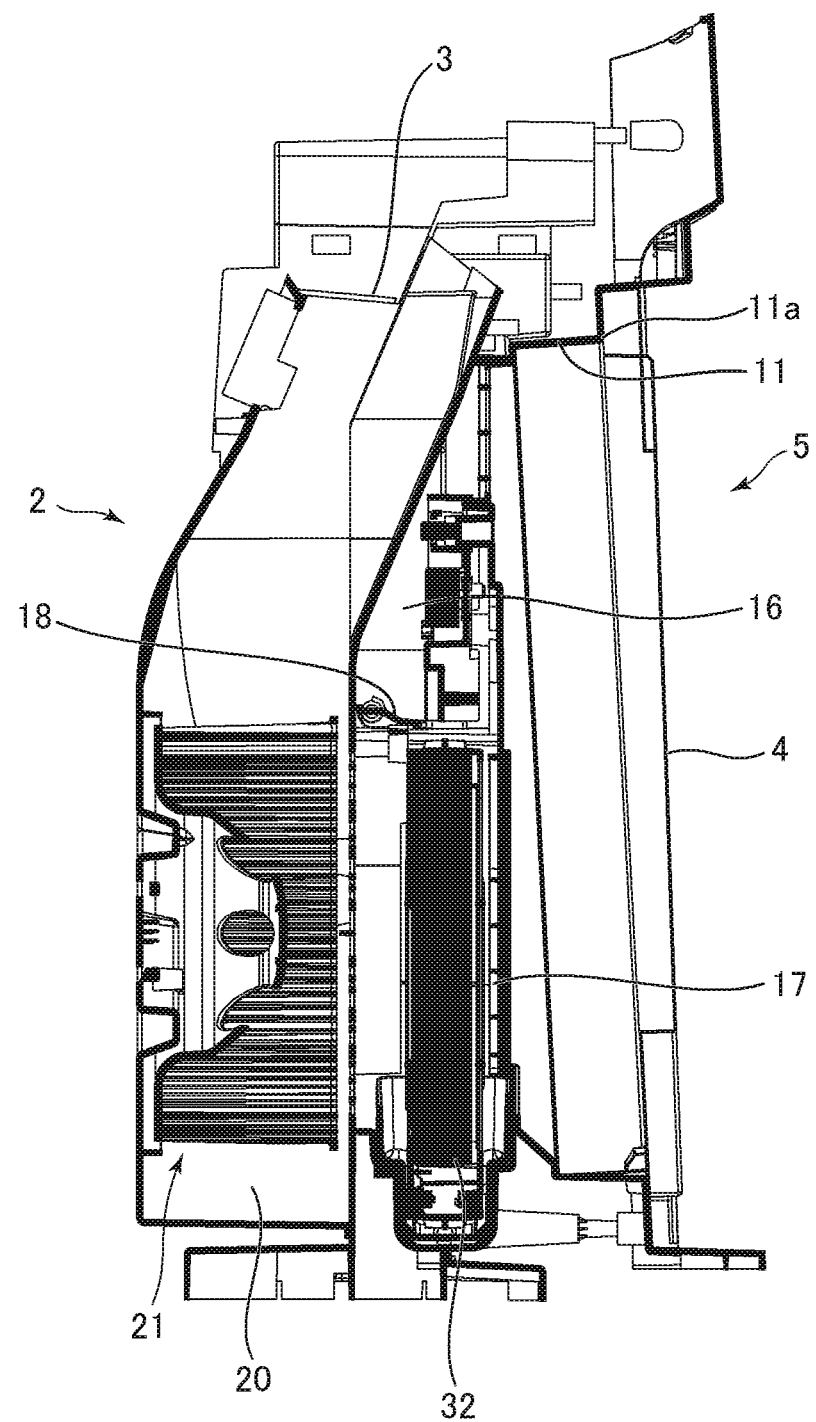
FIG. 1 is a cross-sectional side view illustrating an internal configuration of an air conditioner according to a first embodiment of the present disclosure.
Figure 2:
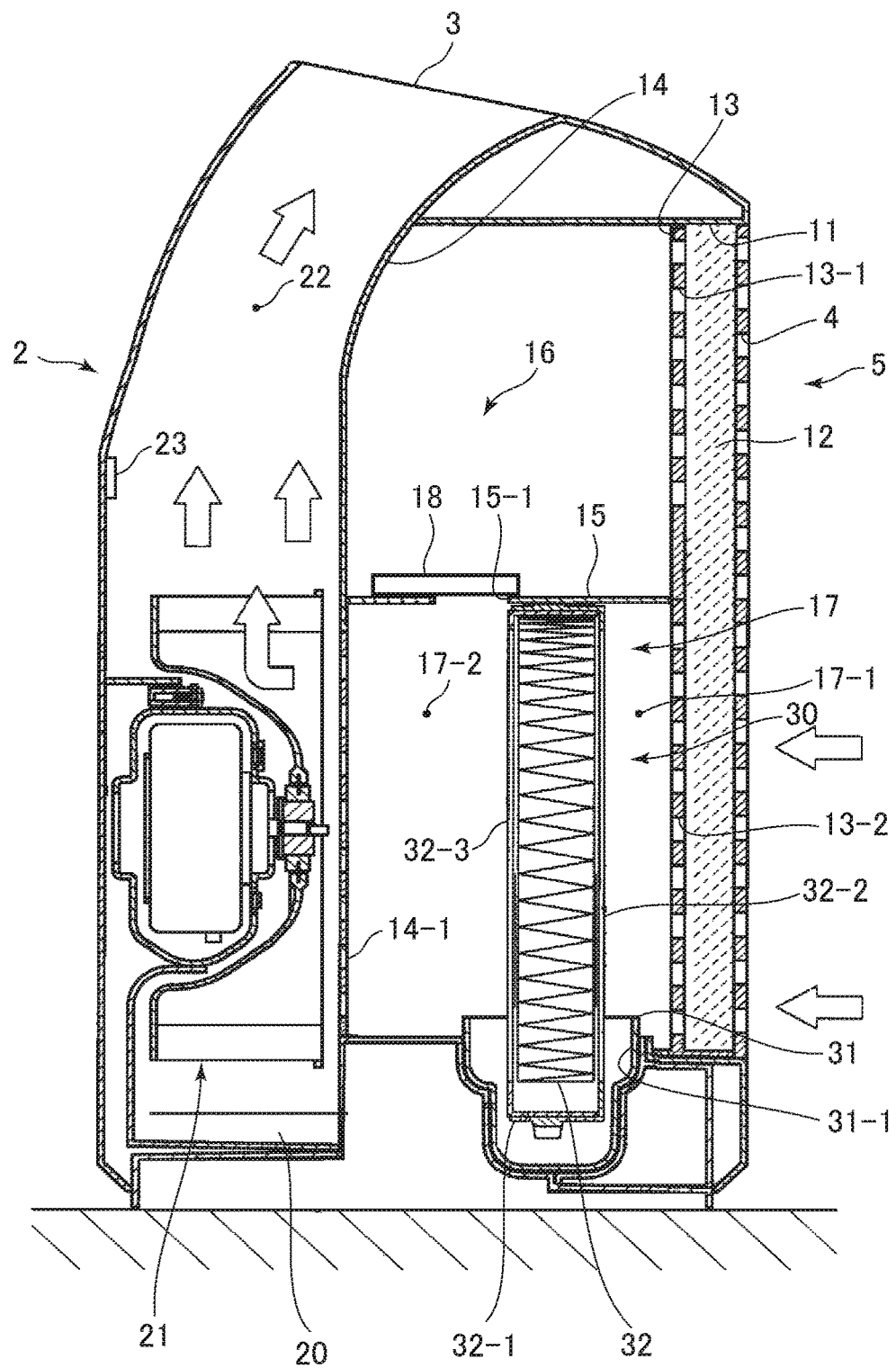
FIG. 2 is a cross-sectional side view briefly illustrating the air conditioner with a divider closed.
Figure 3:
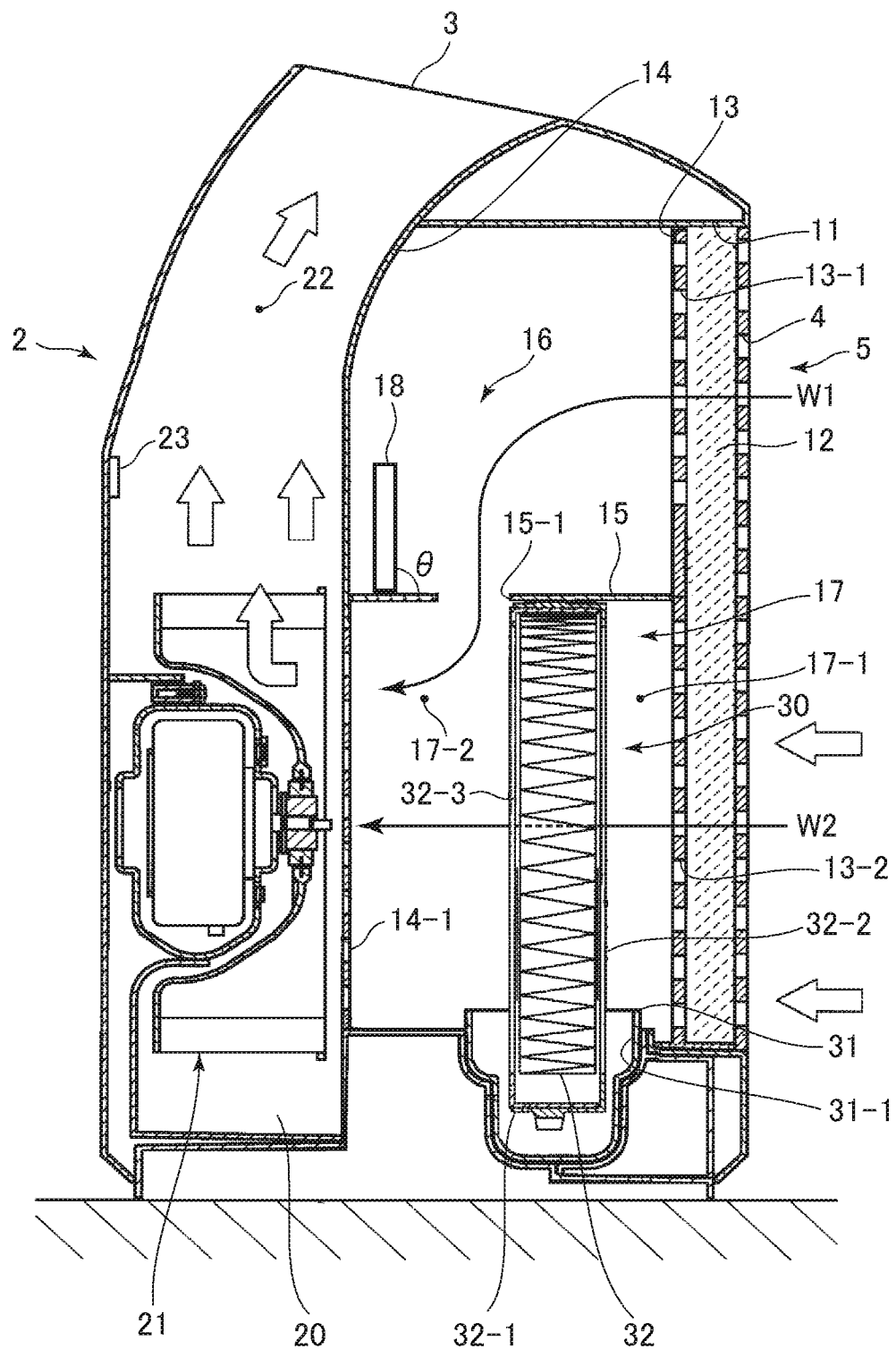
FIG. 3 is a cross-sectional side view briefly illustrating the air conditioner with the divider open.

Described below is an example of a specific configuration of an air conditioner according to a first embodiment of the present disclosure. The air conditioner according to a first embodiment of the present disclosure has, for example: a humidification function to suck indoor air into a body of the air conditioner, humidify the sucked air, and blow out the humidified air; and an air cleaning function to suck indoor air into a device, clean the sucked air, and blow out the cleaned air. FIG. 1 is a cross-sectional side view illustrating an internal configuration of the air conditioner according to the first embodiment of the present disclosure. FIG. 2 is a cross-sectional side view briefly illustrating the air conditioner with a divider closed. FIG. 3 is a cross-sectional side view briefly illustrating the air conditioner with the divider open.

As illustrated in FIG. 1, the air conditioner 1 includes: an outlet 3 in an upper-front portion of a body 2; a controller (not shown) provided on a top face of the body 2 and including, for example, a switch and a button; and a controller (not shown) controlling a divider to be described later to drive, and various kinds of operation (such as humidification operation, air cleaning operation, and automated operation). Formed on a back face of the body 2 is a filter housing 11 substantially recessed. The filter housing 11 has a filter opening 11a to which a back face panel 5 is removably attached. The back face panel 5 includes an inlet 4. The inlet 4 is, for example, an opening provided with a latticed dividing plate.

As illustrated in FIG. 2, the air conditioner 1 includes: an air blower 21 taking air from the inlet 4, and blowing out the air from the outlet 3; a filter 12 purifying the air, a first chamber 16 and a second chamber 17 taking the air purified by the filter 12; a humidification filter 32 provided in the second chamber 17, and humidifying the air taken into the second chamber 17; and a divider 18 opening and closing an opening 15-1 that provides communication between the first chamber 16 and the second chamber 17, and adjusting a volume of the air taken from the first chamber 16 into the second chamber 17. The air taken from the first chamber 16 into the second chamber 17 and/or the air taken into the second chamber 17 (that is, the air taken from the inlet 4 into the second chamber 17 not through the first chamber 16) is blown out from the outlet 3.

The filter housing 11 houses the filter 12 including a prefilter, a deodorizing filter, and a dust collecting filter layered together in the stated order from the back face panel 5.

The prefilter collects coarse dust particles in the air. The prefilter is a meshed sheet formed of, for example, polypropylene.

The deodorizing filter adsorbs an odor component in the air to deodorize the air.

The dust collecting filter collects dust in the air, specifically including fine dust and microparticles such as PM 2.5 a particle size of which is smaller than a predetermined size (e.g., 3 μm). The dust collecting filter, which is, for example, a high-efficiency particulate air (HEPA) filter, includes: a filter element (not shown), and a frame member (not shown) bonded with hot-melt adhesive to cover the filter element.

The body 2 is divided by a first separation wall 13 and a second separation wall 14 positioned away from the filter housing 11. Moreover, in the body 2, a space between the first separation wall 13 and the second separation wall 14 is vertically partitioned into the first chamber 16 on the top and the second chamber 17 on the bottom. The first chamber 16 is provided above the second chamber 17, contributing to effective use of a narrow space in the body 2.

The first separation wall 13 includes: a first communication hole 13-1 communicating with the first chamber 16; and a second communication hole 13-2 communicating with the second chamber 17. Furthermore, the second communication hole 13-2 faces a substantially circular surface of the humidification filter 32, and is formed in a lower portion of the first separation wall 13.

A partition 15 is provided between the first chamber 16 and the second chamber 17. The partition 15 includes the opening 15-1 that provides communication between the first chamber 16 and the second chamber 17. Furthermore, the opening 15-1 is covered with the divider 18 substantially shaped into a plate to open and close. Specifically, in providing the communication between the first chamber 16 and the second chamber 17, the opening 15-1 is positioned closer to the outlet 3 than to the humidifying filter 32 in the second chamber 17. Such a feature makes it possible to send the air from the first chamber 16 to the second chamber 17, to let the air travel inside the second chamber 17 without passing through the humidification filter 32 in the second chamber 17, and to allow the air to blow toward the outlet 3. Note that the opening 15-1 may include a plurality of openings 15-1.

The divider 18 has opposing ends pivotally supported on the partition 15, and is controlled by a driving motor (not shown) to be driven in a substantially fan-like movement with the angle of the divider 18 variable in multiple steps. Hence, the divider 18, controlled and driven by the controller, can open or close the opening 15-1 of the partition 15. The divider 18 can move between an angle θ ranging from, for example, 0° to 90°. Note that the divider 18 may be slidable or operable like a shutter.

Specifically, as illustrated in FIG. 2, when the angle θ of the divider 18 is 0°, the opening 15-1 is closed by the divider 18. Hence, no air flows from the first chamber 16 into the second chamber 17. When the opening 15-1 is open with the divider 18 angled at the angle θ of 15°, a small volume of air flows from the first chamber 16 into the second chamber 17. As illustrated in FIG. 3, when the opening 15-1 opens with the divider 18 angled at the angle θ of 90°, the maximum amount of air flows from the first chamber 16 to the second chamber 17.

As illustrated in FIGS. 2 and 3, the opening 15-1 is formed, on the partition 15, closer to the second separation wall 14. Found directly below the opening 15-1 are a second half 17-2 of the second chamber 17, and a filter rear face 32-3 on a rear of the humidification filter 32 positioned in a first half 17-1 of the second chamber 17. The opening 15-1 is positioned on the partition 15, so that the filter rear face 32-3 on the rear of the humidification filter 32 can be found, in depth of the partition 15, through the opening 15-1.

Formed away from the second chamber 17 of the body 2 is an air blower housing 20 in which the air blower 21 is housed. That is, the air blower 21 is provided closer to the outlet 3 than to the second chamber 17. Such a feature makes it possible to send the humidified and/or purified air collected in the second chamber 17 to the outlet 3 in a short distance. Formed in a lower portion of the second separation wall 14 is a third communication hole 14-1 providing communication between the second chamber 17 and the air blower housing 20. The air blower housing 20 connects to an air path 22 communicating with the outlet 3 positioned above.

The air blower 21, which is a centrifugal fan such as a sirocco fan to be driven by an air blower motor, sucks air along a shaft of the air blower 21 and circumferentially blows out the air. The air blower 21 is disposed so that the rotational center of the fan is oriented toward the second chamber 17. Note that higher output (rotation speed) of the air blower 21 can increase the air volume; whereas, lower output of the air blower 21 can decrease the air volume.

An ion generator 23 generates ions by application of high voltage. The ion generator 23 is provided to an end of the air path 22 inside the body 2. Hence, the ions generated by the ion generator 23 flow along with the airflow of the air blower 21, and blow out from the outlet 3 together with the air. Note that the ions are generated by, but not limited to, the above ion generator 23. Alternatively, any given electric discharger may be applicable as long as the electric discharger generates such substances as electrons, ozone, radicals, and active species by electric discharge.

A display (not shown) is provided near the outlet 3 of the body 2. The display presents, for example, an uncleanness level, a temperature, and a humidity of the air. Moreover, sensors in various kinds are provided to detect the uncleanness level, the temperature, and the humidity of the air, and the controller (not shown) controls constituent features in various kinds of operation in accordance with detection signals from the sensors. For example, in the humidification operation and the automated operation, the controller determines whether the humidity is appropriate in accordance with a detection signal from a humidity sensor to control a humidifier 30 and the air blower 21.

The second chamber 17 includes the dehumidifier 30 for humidifying the air purified by the filter 12. The humidifier 30 humidifies the air passing therethrough by suction force from the air blower 21. The humidifier 30 includes: a tray 31 storing water; a humidifying filter 32 shaped substantially circularly and disposed so that a lower portion of the humidifying filter 32 is immersed in the water of the tray 31; and a cover body partially surrounding the humidifying filter 32.

In the humidifier 30, the humidifying filter 32 is rotated and immersed in the water of the tray 31, and the air passing through the second communication hole 13-2 of the first separation wall 13 is blown onto the humidifying filter 32. Hence, the water contained in the humidifying filter 32 evaporates to humidify the air. Moreover, the humidifying filter 32 has a lower portion provided with a notch (not show) that is not in contact with the water in the tray 31. In non-humidification operation to be described later, the humidifying filter 32 of the humidifier 30 stops rotating. The notch of the humidifying filter 32 positioned in the tray 31 below keeps the humidifying filter 32 from drawing up the water in the tray 31, such that the humidifying filter 32 does not humidify the air.

The tray 31 includes: a water receiver 31-1 substantially shaped into a box with the top open; and a mount (not shown) on which a water storage tank (not shown) is mounted. The tray 31 is freely loaded and unloaded from a side opening (not shown) formed on a side of the body 2.

The mount has a protrusion (not shown) formed to open a water stop valve provided to the water storage tank, so that, when the water storage tank is installed, the water is guided into the tray 31.

The humidifying filter 32 is formed of a non-woven accordion-folded fabric having water absorbency and a predetermined thickness. This humidifying filter 32 is held in a frame body 32-1, and detachably stored in the water receiver 31-1 of the tray 31.

Note that the humidifying filter 32 may be configured as, for example, a watermill including a plurality of buckets provided to the frame body 32-1 to collect the water stored in the water receiver 31-1, and pour the water on a filter face of the humidifying filter 32. Alternatively, the water in the water receiver 31-1 is pumped and forcibly blown from above to the humidifying filter 32.

A cover body (not shown), which stands between the water receiver 31-1 and the mount, surrounds the left-half of an edge of a surface 32-2 of the humidifying filter 32. Hence, the edge of the humidifying filter 32 is surrounded by a curve (not shown) provided to the cover body and the lower half of the first separation wall 13. Hence, in the humidification operation, the air can pass through the surface 32-2 of the humidifying filter 32.

Such features make it possible to increase the air to pass through the humidifying filter 32, and to reduce unhumidified air leaking through a front edge of the humidifying filter 32 and flowing into the second half 17-2 of the second chamber 17.

The body 2 includes inside an air blowing path in which the air flows from the inlet 4 of the back panel 5 through the first chamber 16 or the second chamber 17 and the air blower housing 20. In the air blowing path, the air is then purified by the filter 12 and/or is humidified and blown toward the outlet 3.

Specifically, as illustrated in FIG. 3, the air blowing path includes two air paths, namely a first air path and a second air path, defined in the body 2. Hereinafter, a reference sign W1 denotes a flow of air to be blown in the first air path, and a reference sign W2 denotes a flow of air to be blown in the second air path. In the first air path, the divider 18 of the first chamber 16 opens, and the external air is sucked from the inlet 4 of the back face panel 5. Then, in the first air path, the air passes through the filter 12 and the first communication hole 13-1 of the first separation wall 13, and is guided into the first chamber 16. Then, in the first air path, the air passes from the opening 15-1 of the partition 15 through the second half 17-2 of the second chamber 17, and then through the third communication hole 14-1 of the second separation wall 14. Then, in the first air path, the air flows to the air blower 21 inside the air blower housing 20.

In the second air path, the air is sucked from the inlet 4 of the back face panel 5. Then, in the second air path, the air passes through the filter 12, the second communication hole 13-2 of the first separation wall 13. The air in the second air path then passes from the first half 17-1 of the second chamber 17 through the humidifying filter 32 and the second half 17-2 of the second chamber 17. The air in the second air path then passes through the third communication hole 14-1 of the second separation wall 14, and flows to the air blower 21 inside the air blower housing 20. The airflow W1 running through the first air path and the airflow W2 running through the second air path pass through the second chamber 17, and are blown out from the outlet 3.

Described below are operation of the divider 18 when the air conditioner is in the air cleaning operation and the humidification operation, and the air flowing through the first air path and the second air path.

As illustrated in FIG. 3, when the air conditioner is in the air cleaning operation, namely, the non-humidification operation, the divider 18 of the first chamber 16 is driven to open the opening 15-1 of the partition 15, so that the first air path as well as the second air path is defined.

When the divider 18 is open such that the opening 15-1 is open, the airflow W1 running through the first air path is guided from the first chamber 16 toward the filter rear face 32-3 on the rear of the humidifying filter 32 in the second chamber 17. Moreover, the airflow W1 joins the airflow W2 passing through the humidifying filter 32 and running through the second air path, flows into the air blower housing 20 provided closer to the outlet 3 of the body 2, and blows through the air path 22 out of the outlet 3. Specifically, the air flowing from the first chamber 16 into the second-half 17-2 of the second chamber 17 does not pass through the humidifying filter 32. Such a feature makes it possible to keep clean the humidifying filter 32 positioned in the first half 17-1 of the second chamber 17. Note that, in the non-humidification operation, the humidifying filter 32 of the humidifier 30 stops rotating, and the notch (not shown) of the humidifying filter 32 is positioned inside the tray 31 below. The notch of the humidifying filter 32 cannot draw the water in the tray 31, such that the humidifying filter 32 does not humidify the air. The humidifying filter 32, which is dry, allows a portion of the external air to pass through the surface 32-2 of the dry humidifying filter 32. Hence, the air not humidified blows into the second half 17-2 of the second chamber 17.

Thanks to this feature, the pressure rises for the air to pass through the humidifying filter 32, making it possible for most of the external air to run through the first air path. Moreover, a portion of the external air, although running through the second air path, is small in volume, making it possible to keep the humidifying filter 32 clean for a long period of time.

As illustrated in FIG. 2, when the air conditioner is in the humidification operation, the divider 18 of the first chamber 16 is driven to close the opening 15-1 of the partition 15, so that the second air path alone is defined in the body 2. Furthermore, when the humidifying filter 32 of the humidifier 30 rotates, the humidifying filter 32 except the notch draws the water in the tray 31. Hence, the external air passing from the surface of the humidifying filter 32 is humidified.

Specifically, the airflow W2 running through the second air path passes through the humidifying filter 32 in the second chamber 17 to be humidified, and flows into the second half 17-2 of the second chamber 17. The airflow W2 then passes through the third communication hole 14-1 in the lower portion of the second separation wall 14, flows into the air blower housing 20, and blows through the air path 22 out of the outlet 3.

Thanks to such a feature, the divider 18 is controlled and driven to close the opening 15-1, such that the external air can pass through the second air path alone defined in the second chamber 17. Specifically, the air passing through the filter 12 all flows into the second chamber 17, and passes through the humidifying filter 32. All the air is humidified, and sent to the second half of the 17-2 of the second chamber 17. The humidified air further flows into the air blower housing 20, and blows through the air path 22 out of the outlet 3. Thanks to such a feature, all the air passing through the filter 12 is humidified, making it possible to sufficiently humidify the air.

The opening 15-1 is positioned closer to the outlet 3 than to the humidifying filter 32, and provided to the partition 15 between the first chamber 16 and the second chamber 17 so that the air from the first chamber 16 is taken into the second chamber 17. Thanks to the feature, when the humidification operation is switched to the air cleaning operation, the airflow W1 running through the first air path and the airflow W2 running through the second air path join together in the second half 17-2 of the second chamber 17, making it possible to quickly dry the interior of the second chamber 17.

Moreover, the opening 15-1 on the partition is provided close to the rear of the humidifying filter 32. Hence, the airflow W1 running through the first air path descends from the opening 15-1 of the first chamber 16 toward the filter rear face 32-3 of the humidifying filter 32 of the second chamber 17 positioned below. The airflow W1 then runs from the second half 17-2 of the second chamber 17, and passes through the third communication hole 14-1 of the second separation wall 14. The airflow W1 further flows into the air blower housing 20, and blows through the air path 22 out of the outlet 3 of the body 2.

Thanks to such a feature, the divider 18 is controlled and driven to close the opening 15-1, such that the first air path defined from the first chamber 16 to the second chamber 17 can be easily blocked. Moreover, the opening 15-1 can be hermetically sealed by the divider 18, eliminating the risk that the first air path is inadvertently defined. Such a feature makes it possible to keep from generating noise of incoming air passing through the opening 15-1. Note that, in the humidification operation, the opening is closed. Alternatively, in order to increase the volume of the air, the divider 18 may be moved to adjust the volume of the air to be taken from the first chamber to the second chamber.

Moreover, the first air path is provided not to allow the air to pass through the humidifying filter 32. Such a feature makes it possible to increase the volume of the air in the air cleaning operation even if the power of the air blower is constant.

Furthermore, the controller controls to drive the driving motor to cause the divider 18 to open the opening 15-1 in the air cleaning operation, and to close the opening 15-1 in the humidification operation. Such a feature makes it possible to easily switch the divider 18 in the air cleaning operation or in the humidification operation.

Note that, in the above humidification operation, the divider 18 is controlled and driven to close the opening 15-1. Alternately, the divider 18 may be controlled and driven to open the opening 15-1 to increase the volume of the air also in the air cleaning operation. Such a feature makes it possible to increase the volume of air even if the power of the air blower 21 is constant.

Note that the air conditioner may allow the air taken from the first chamber into second chamber alone to blow out of the outlet 3. That is, the air conditioner may include a shutter mechanism to block the air flowing into the humidifier 30 in the first half 17-1 of the second chamber 17. The shutter mechanism is provided between the first separation wall 13 and the humidifying filter 32 and controlled to open to allow the air to flow into the humidifier 30 or to close to block the air not to flow into the humidifier 30.

When the room is not appropriately humidified if the automated operation is selected other than the above air cleaning operation and humidification operation, the air conditioner runs in the humidification operation. In the humidification operation, the divider 18 is controlled and driven to close the opening 15-1, and the humidifying filter 32 of the humidifier 30 rotates and draws up the water in the tray 31. Hence, the humidifying filter 32 allows external air to pass therethrough. Moreover, in the humidification operation, the opening 15-1 may partially open to increase the volume of the air. Furthermore, when the room is appropriately humidified, the air conditioner runs in the air cleaning operation (the non-humidification operation). In the non-humidification operation, the divider 18 is controlled and driven to open the opening 15-1, and the humidifying filter 32 of the humidifier 30 stops rotating so that the notch of the humidifying filter 32 is positioned downwardly. Hence, the humidifying filter 32 keeps from drawing up the water in the tray 31.

While there have been described what are at present considered to be certain embodiments of the invention, it will be understood that various modifications may be made thereto, and it is intended that the appended claim cover all such modifications as fall within the true spirit and scope of the invention.

What is claimed is:

1. An air conditioner, comprising:
   an air blower configured to take in air from an inlet, and to blow out the air from an outlet;
   a filter configured to purify the air;
   a first air path and a second air path, wherein air filtered through the filter is blown into the first air path and the second air path;
   a humidification filter provided on the second air path, and configured to humidify the air blown into the second air path;
   a divider provided on the first air path, and configured to adjust the air traveling from the first air path toward the second air path; and
   an opening configured to guide the air traveling from the first air path to the second air path, wherein:
   the divider opens and closes the opening by rotating about a rotation axis,
   the rotation axis is located at a first end of the divider and positioned across the opening from the filter, and
   the divider is displaced by a second end pivoting around the first end to a position where the second end is in an upstream direction of the first air path at the opening when the opening is transitioned from a closed state to an opening state.

2. The air conditioner according to claim 1, wherein the opening is disposed on the second air path to guide the air traveling from the first air path toward the second air path, to flow closer to the outlet than to the humidification filter.

3. The air conditioner according to claim 1, wherein the divider defines the first air path when the opening opens, and blocks the first air path when the opening closes.

4. The air conditioner according to claim 1, wherein the divider adjusts, in multiple steps, an opening angle with respect to the opening about the rotation axis.

5. The air conditioner according to claim 1, wherein when the opening is closed by the divider, a humidification operation is performed to humidify the air.

6. The air conditioner according to claim 5, wherein in the humidification operation, the filter draws up water.

7. The air conditioner according to claim 1, wherein in an operation to increase humidity of the air, the divider closes the opening.

8. The air conditioner according to claim 1, wherein the first air path before passing through the opening is provided above the second air path.

9. The air conditioner according to claim 1, wherein the air blower is provided closer to the outlet than to the opening.

10. The air conditioner according to claim 1, further comprising
a partition partitioning the first air path before passing through the opening and the second air path.

11. The air conditioner according to claim 1, wherein
the first air path is divided into a first chamber and a second chamber; and
the second air path is defined inside the second chamber.

12. The air conditioner according to claim 1, wherein the humidification filter is a rotational humidification filter.

* * * * *